United States Patent

[11] 3,524,414

| [72] | Inventors | Kent N. Johnson<br>South Holland, Illinois;<br>Bradford Johnstone, Blue Island, Illinois |
|---|---|---|
| [21] | Appl. No. | 739,331 |
| [22] | Filed | June 24, 1968 |
| [45] | Patented | Aug. 18, 1970 |
| [73] | Assignee | Pullman Incorporated<br>Chicago, Illinois<br>a Corp. of Delaware |

[54] HOPPER VEHICLE CONSTRUCTION
15 Claims, 10 Drawing Figs.

[52] U.S. Cl............................................. 105/404,
105/247, 105/406
[51] Int. Cl...................................................... B61d 7/00
[50] Field of Search............................................ 105/404,
406, 247, 396, 410, 249—254

[56] References Cited
UNITED STATES PATENTS

| 692,457 | 2/1902 | King............................ | 105/404 |
| 719,464 | 2/1903 | Hansen......................... | 105/406 |
| 803,330 | 10/1905 | Dodds et al.................. | 105/404 |
| 1,124,980 | 1/1915 | Weaver........................ | 105/404 |

*Primary Examiner*— Arthur L. La Point
*Assistant Examiner*— Richard A. Bertsch
*Attorney*— Hilmond O. Vogel and Wayne Morris Russell ABSTRACT: A vehicle hopper construction having a hopper end slope sheet, upright vertical web and flat lower shear plate forming a torsion box design in the area of the side girder of the car to reduce torsional stresses to the coupler forces, where said shear plate may be bowed upwardly in gull wing design for coupling the center sill to the side sill to reduce the depth of the side girders and wherein the slope sheet may be bowed inwardly or the bolster web may be bowed outwardly to increase the cross sectional area of the torsion box and thereby reduce the stresses upon it due to coupler force.

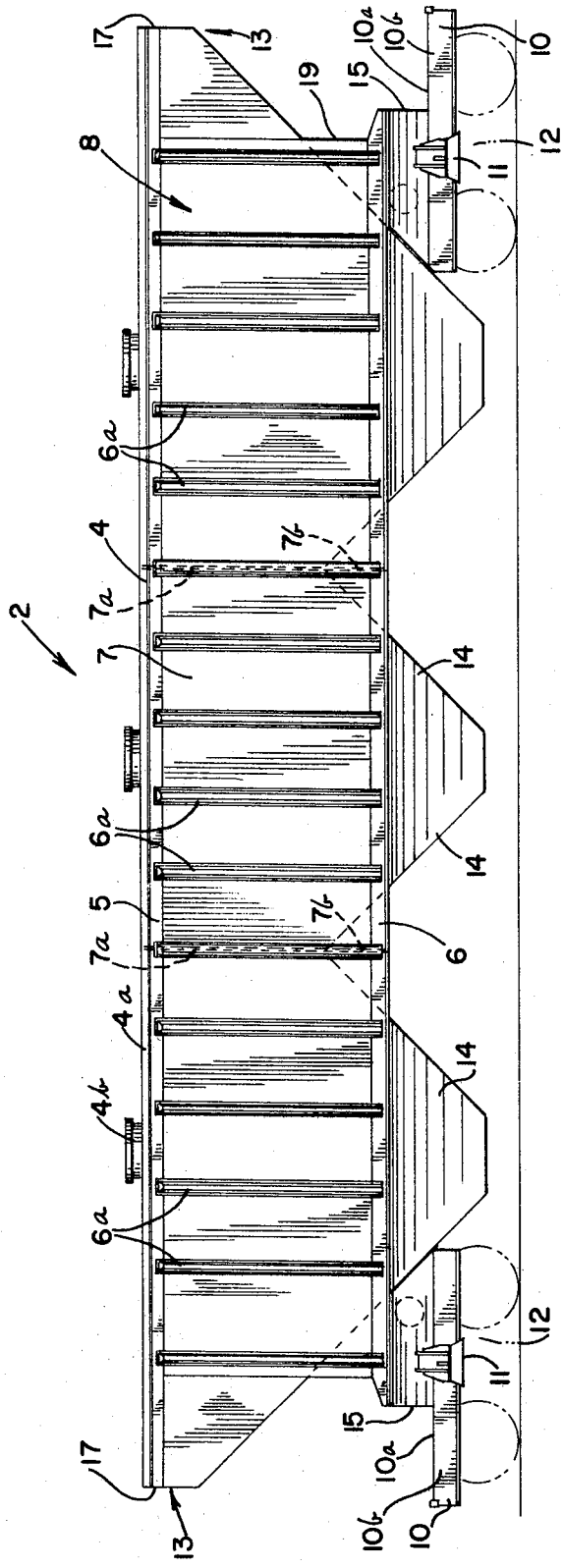

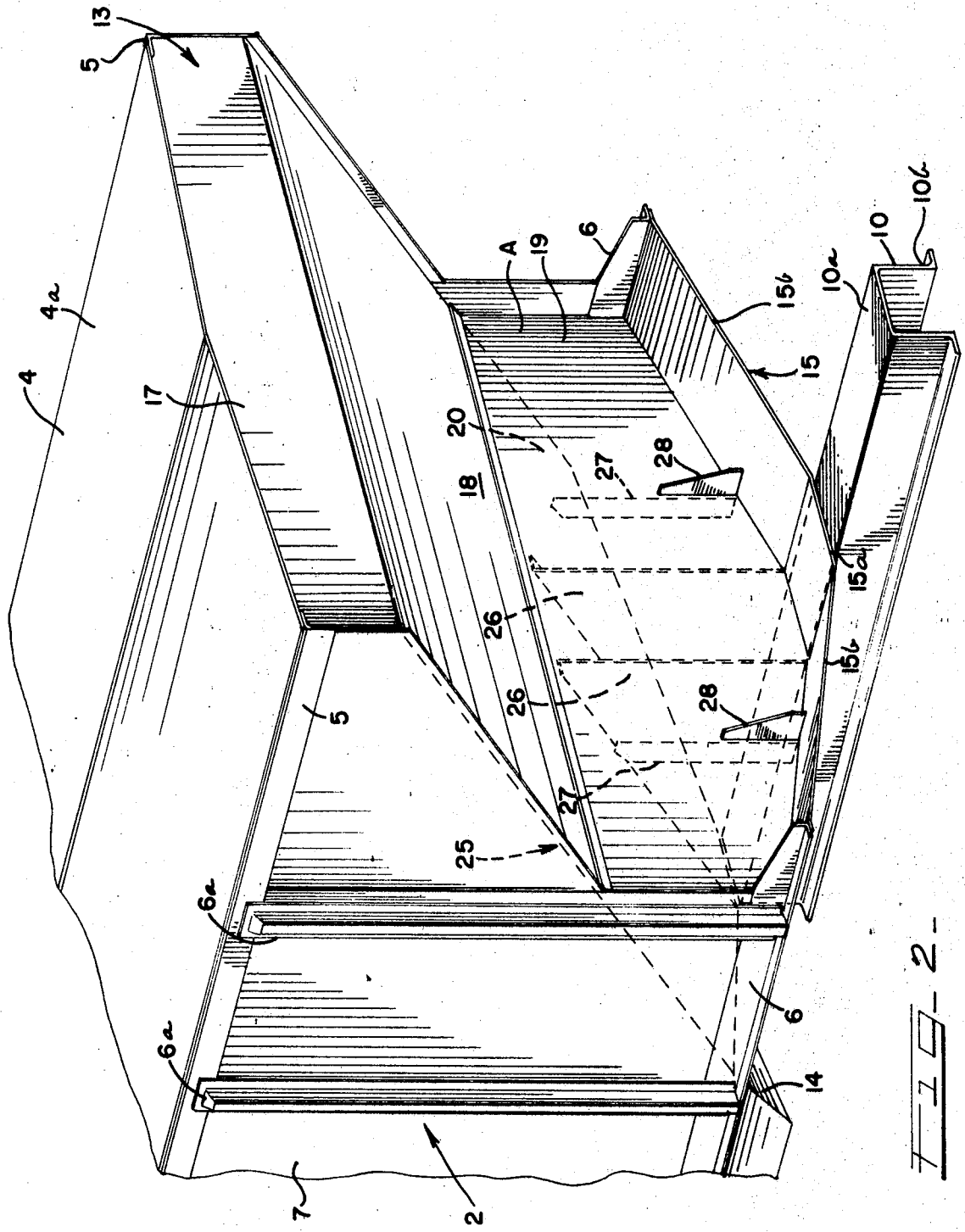

Patented Aug. 18, 1970
3,524,414
Sheet 3 of 7
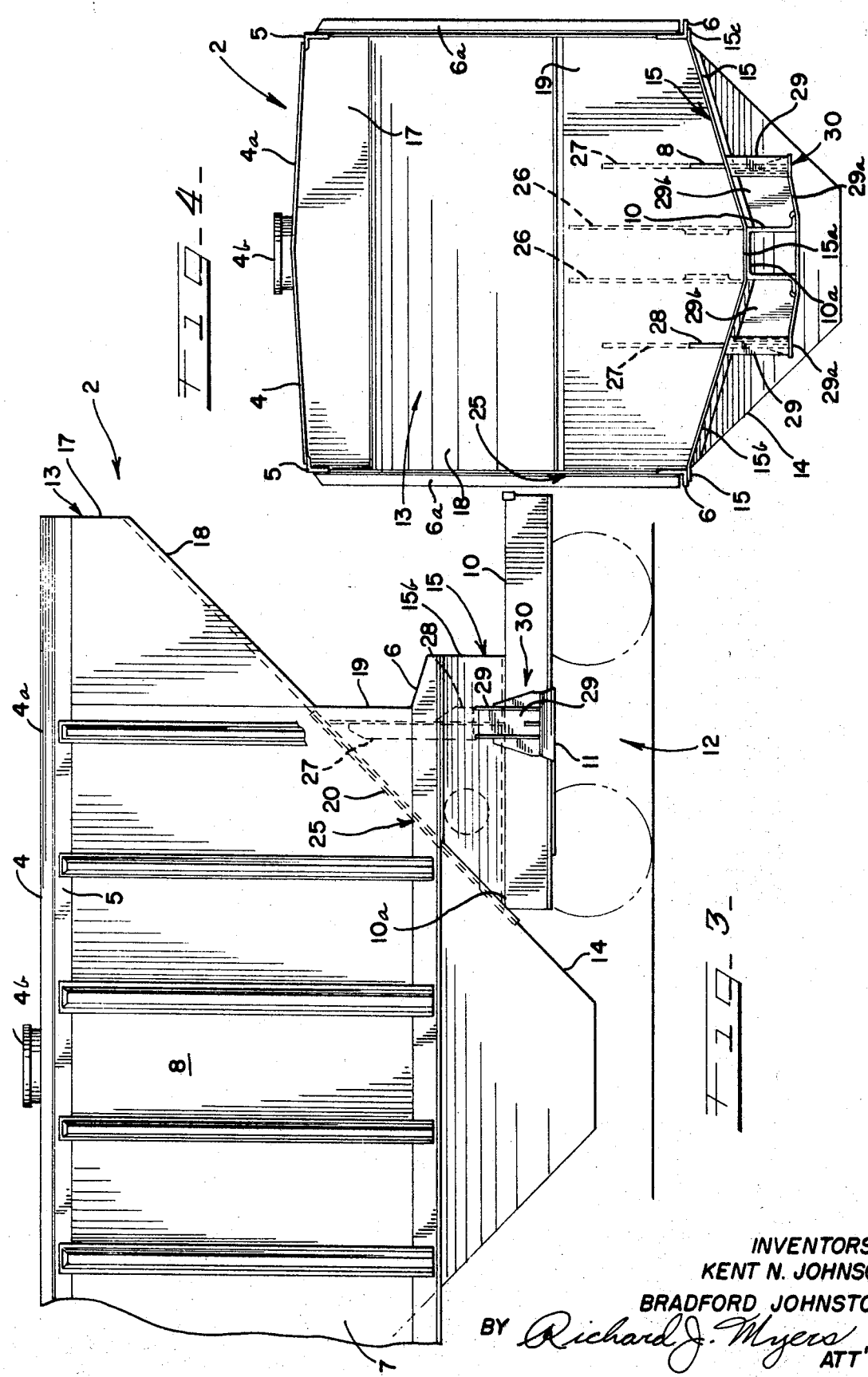
INVENTORS
KENT N. JOHNSON
BRADFORD JOHNSTONE
BY Richard J. Myers
ATT'Y.

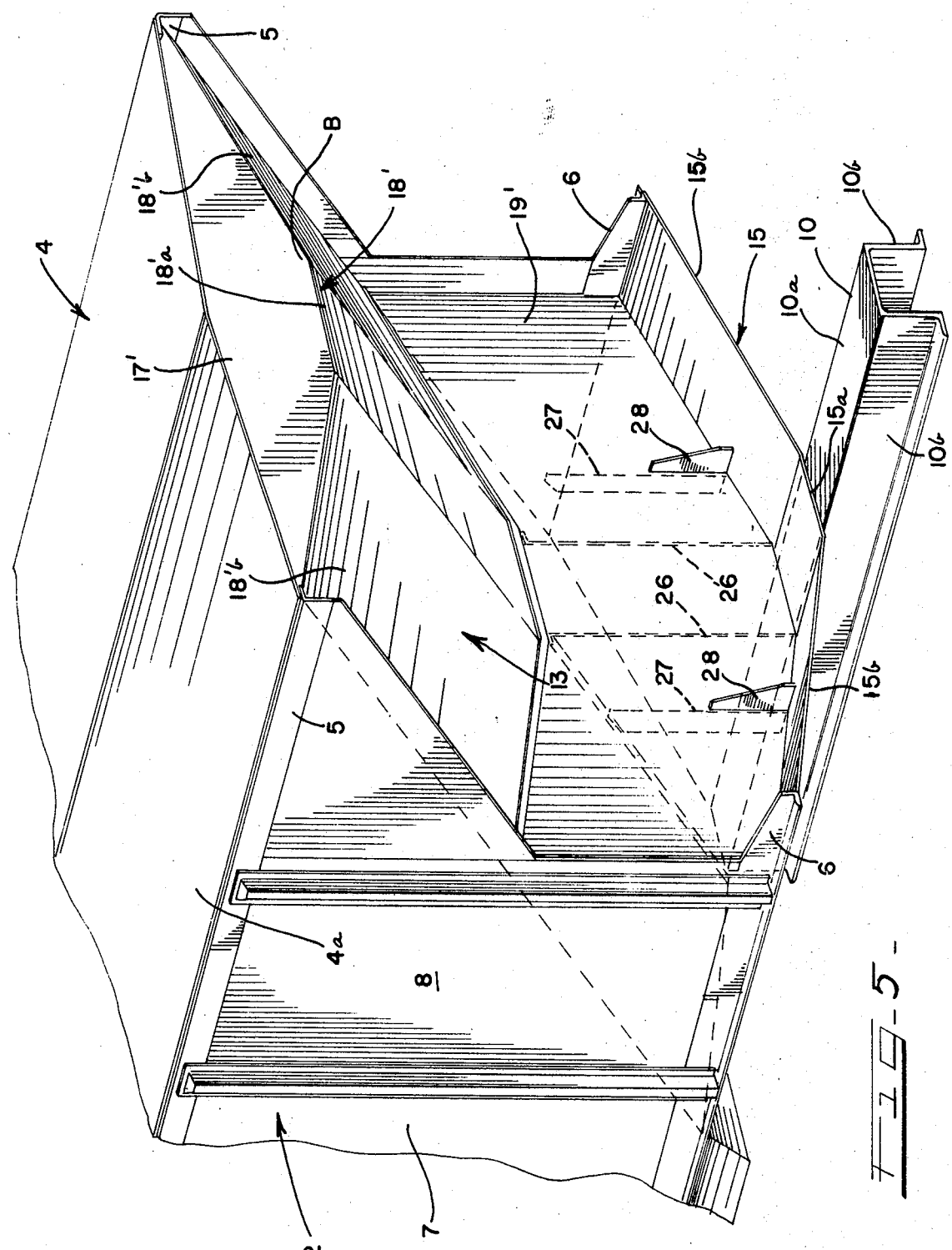

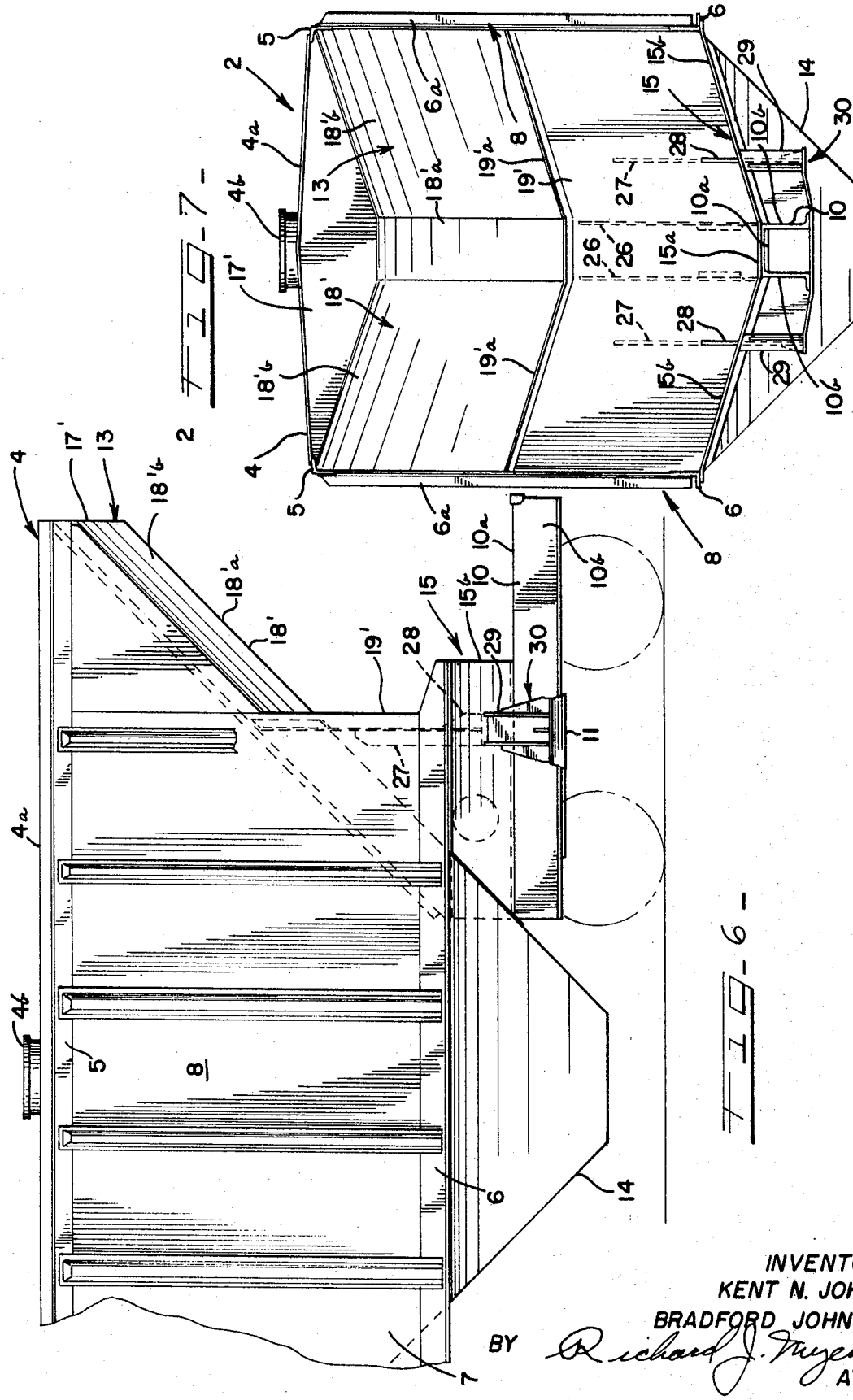

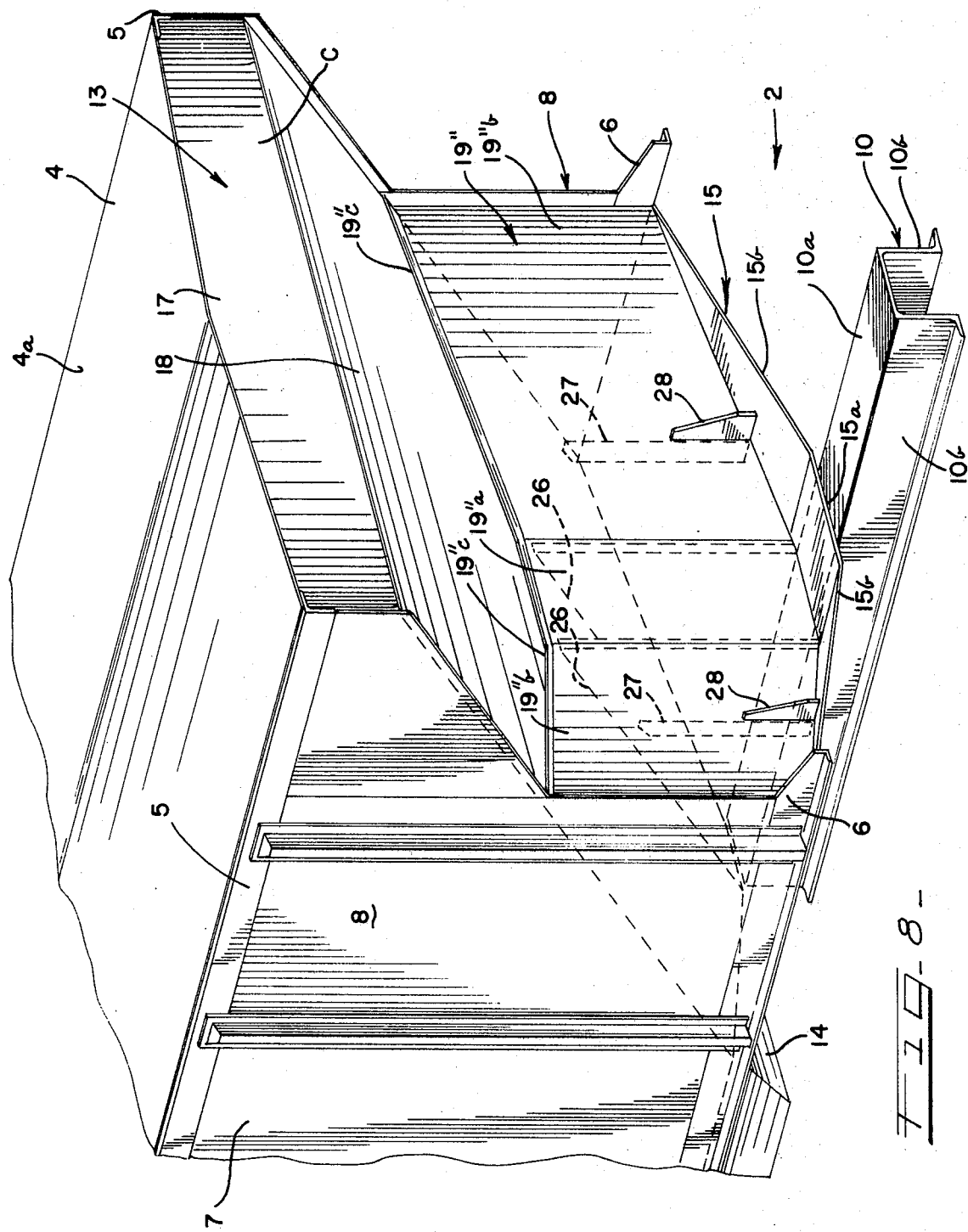

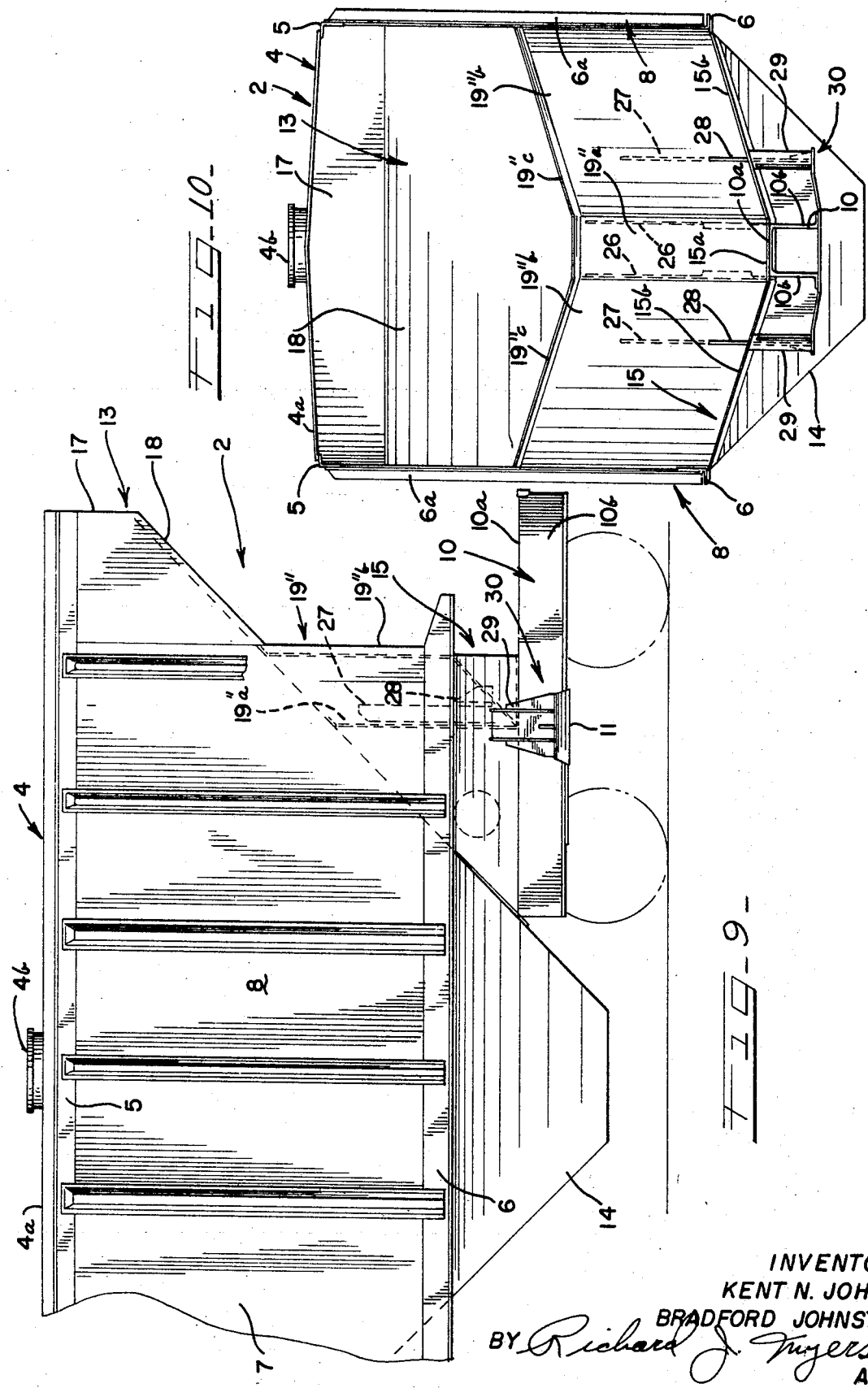

HOPPER VEHICLE CONSTRUCTION

BACKGROUND OF THE INVENTION (1) Field of the Invention

The field of art to which this invention pertains is hopper vehicles and in particular to railroad hopper cars having a combination end torque box arrangement between the stub center sill and the hopper slope sheet at each end of the car.

(2) Description of the Prior Art

Attachment of center sills of the straight through or stub sill type to the hoppers of the hopper car is, of course, well known in the art but the side girders of the car have a depth extending down to the height of the center sill providing for unnecessary use of side girder material and increasing the weight of the car and thereby reducing the amount of freight material carried by the car, for, a lighter weight car can carry more freight weight than a heavier car for the same amount of total weight of car plus weight of lading carried. It is, therefore, desired to save the use of unnecessary side girder material and yet maintain torsion box efficiency or to keep plate thickness minimal, and yet absorb end coupler forces without damage to the car. A saving in car weight is a saving in fuel or motive power, as larger loads can be hauled for the same amount of motive power or fuel. It is these problems involved in the prior art which are solved by the applicant's invention.

SUMMARY

The invention has for its principal object an improved vehicle or car construction which reduces the depth of the car side girders by the use of a gull wing design connection between the end portions of the center sill arrangement of the car, whether through or stub center sill, and the car side sill construction. The invention further provides for an improved torsion or torque box construction to reduce stresses on the elements of the torque box, namely, the end slope sheet, the bolster web or upright end wall portion, and the shear plate connecting with the side sill construction. The improved torque box construction relies on increased torque box area by bowing the slope sheet in, or bowing the bolster web outwardly and yet maintain the desired 45° or less of the end slope for lading dumping. The gull wing arrangement saves on post and side sheet material of the side girder construction. These and other objects of the invention will become apparent from reference to the following description, appended claims and attached drawings, to wit:

BRIEF DESCRIPTION OF THE DRAWINGS

FIGS. 1 through 4 are each full side view, perspective end view, partial side view and end view, respectively, of one embodiment of the novel hopper car arrangement;

FIGS. 5 through 7 are each perspective view, partial side view, and end view, respectively, of a second modification of the novel hopper car arrangement; and FIGS. 8 through 10 are each perspective view, partial side view and end view, respectively, of still another modification of the novel inventive hopper car construction.

DESCRIPTION OF THE PREFERRED EMBODIMENTS

With reference now to the drawings, it is seen that there are three modifications of an end construction of a hopper railroad car as shown in FIGS. 1 through 4, 5 through 7, and 8 through 10. Where like features exist in each of the embodiments the same reference characters will be used. For example, in all instances there is shown a hopper car 2. Each of the modified cars 2 is provided with a top portion 4 (including a roof 4a and hopper hatches 4b) having top side plates 5 and bottom side sills 6 and side sheetings 7 and side posts 6a to define both side girders 8 spaced apart from one another to define the usual side walls of the hopper 2. In the arrangements shown there is provided end stub central sills 10 (with top 10a, sides 10b) provided with center plate construction 11 for trucks 12. End walls 13 connect with each of the side girders 8 to define an enclosed hopper car which is provided with three hopper sections 14. The side sills 6 connect with one another through the hopper partition sheets 7a and the cross ridge members 7b. In all three embodiments there is provided a longitudinally extending shear plate means 15 of a gull wing configuration having a flat horizontal, longitudinally extending, central plate portion 15a mounted on the top plate 10a of the end stub center sill 10 and extending therealong to its inner end and a pair of opposite laterally extending upwardly sloping gull wing or shear plate portions 15b, the shear plate portions 15b each at their outer lateral ends being connected with a respective side sill 6 of the car. The construction of the upright end wall portion or bolster web and slope sheet design varies in each of the embodiments as will presently be discussed.

The end walls 13 of the first modification shown in FIGS. 1 through 4 are each defined by a transverse flat upper vertical wall portion 17 connecting with the roof 4a and the side plates 5 and the side sheeting 7 of the side girder 8. A slope sheet member 18 is connected to and extends from the vertical end wall 17 downwardly and inwardly to the bottom of the end hopper 14, the inner end of top plate 10a of the central stub sill 10 extending toward the slope sheet 18. A flat vertical or upright end sheet portion or bolster web 19 has its lower edges sloped to conform and to engage with the upper surfaces of the plate sections 15a and 15b of the gull wing design, the upper terminal laterally extending edge of the bolster web 19 terminating along the flat surface of the slope sheet 18 intermediate the connection of the slope sheet 18 with the end sheet portion 17 and the connection of the inner part of the shear plate 15 with the slope sheet portion 18 defining a slope sheet 20 of a torsion box arrangement 25. The torsion box 25 is defined by the intersection of the surfaces of the gull wing shear plate 15 with the bolster web 19 and the slope sheet section 20. The longitudinal cross sectional area of the triangularly shaped torsion box 25 is greatest in longitudinal vertical sections taken through the end stub sill 10 and least in longitudinal vertical sections taken at the side girders 8. This is because of the gull wing construction. The gull wing construction allows for using less side girder construction and therefore allowing the car to be of lighter weight. Triangular shaped longitudinally extended gusset plates or diaphragms 26 lie along and extend upwardly from the longitudinal ends of the center section 15a of the gull wing shear plate 15 and have upright outward facing edges abutting against the inside surface of the bolster web 19 and have inward diagonally sloping edges engaging with the outer surface of the flat slope sheet portion 20 which diaphragms 26 transfer the load to the three plate elements of the torsion box and maintain the geometrical shape of the torsion sections and stiffen the bent shear plate and slope sheet or bolster web. Additional elongated inner gusset elements 27 and shortened outer gusset elements 28 are provided on opposite sides of the bolster web 19 on the sloped gull wing portions 15b between the side sills 6 and the diaphragm plates 26 and extend inside the box up short of the slope sheets and on the outside just a short distance up. Vertically aligned on the underside of the gull wing sections 15b are vertical struts 29 of the stub bolster arrangement 30, the bolster arrangement 30 providing for central and lateral support over the trucks 12. The upright elements 29 are connected by elements 29a to the center sill which elements 29a of the bolster assembly 30 and its webs 29b are connected to the stub sill 10. All gull wing plate modifications have lateral horizontal longitudinally extending ends 15c and the side sills 6 are L-shaped with the lower horizontal flange extending outwardly, as seen in FIGS. 4, 7 and 10. Thus it is seen that by use of the gull wing design, with the reduction in the amount of side girder necessary, the weight of the car is less and, therefore, greater loads may be carried by the car when considering the total weight of the car plus the load. Consequently, a greater load may be pulled by the same amount of motive power or fuel by "gull winging" of the shear plate of the hopper car.

Coupler forces directed at the stub sills cause torsion to occur in the area of the torsion box. The applied torsion or one half of the coupler force times the distance from the coupler force to the shear center of the trangular beam over twice the area of the torsion box times the thickness of a plate or the plates of the box, such as the bolster web, slope sheet and shear plate, will give us the torsional shear stress which with the bending stresses on these components must be kept below a certain value to prevent damage to the torsion box elements of the hopper car. The larger the area of the torque box, the lower the torsional shear stress of the torque box and, of course, the greater such area, the less will be the thickness of the plates defining the torsion box, that is, the shear, bolster and slope sheet plates. The area of the torque or torsion box is the least at the side girders and the greatest at the stub sills because of the "gull winging" effect in FIG. 1- 4 embodiment.

The following embodiments increase the area and therefore allow for thinner plate sections or reduced stresses on the torque box by either bowing the slope sheet inwardly, as seen in the second embodiment shown in FIGS. 5 through 7, or bowing or turning the upright end portion or bolster web portion outwardly of the car end, as shown in the third embodiment in FIGS. 8 through 10. The shear plate extends on both sides of the bolster plate in all embodiments. In the second modification, the slope sheet 18' comprises a central downwardly sloping plate section 18'a which presents its surfaces in a slope lying in transverse planes while its attached lateral side slope sheet portions 18'b are turned inwardly to extend from the outer central slope sheet portion 18' inwardly to extend to the side girder construction and this results in the upper edges of upper outer laterally extending edges of the bolster web 19' to extend upwardly rather than across in a horizontal straight edge of the FIG. 4 construction. The upward divergent edges 19' a of the bolster web 19' is most readily seen in FIG. 7. The top end portion 17' is provided with lower upwardly sloping lateral edges not shown in the first construction because of the inwardly tapering direction of the slope sheet 18'. Generally elsewise the second embodiment is like the first embodiment.

In the third embodiment (FIGS. 8- 10), the bolster plate or upright lower end part 19", when viewed in horizontal cross section, is deflected or bowed outwardly with the central upright plate portion 19"a being a flat upright portion and presenting a transverse elongated straight structure in horizontal cross section with its outer lateral ends being attached to outwardly extending diverging bolster web end plate portions 19"b, each of which extends rearwardly to the outer ends of the side sill end portions of the side sills 6. The slope sheet 18 and the end top sheet 17 are of the same construction as shown in the first embodiment. The upward sloping edges 19"c of the bolster web 19" occur because the bolster web 19" has its ends 19"b extending laterally and outwardly to intersect an upwardly and outwardly extending slope sheet 18. This third embodiment, like the second embodiment, increases the cross sectional area of the torsion box arrangement at the girders and therefore reduces the stresses in the torque or torsion box arrangement. The diaphragm elements or gussets 26, 26 are the same in construction, location and size in all three embodiments since deviation from the first embodiment occurs only laterally of these diaphragm units whether in the slope sheet (as in the second embodiment) or in the bolster web (third embodiment). The ends of the side sills in the third embodiment extend outwardly of the shear plate. The folding of the bolster web or the slope sheet is at the diaphragm or gussets in the second and third embodiments. It will be appreciated that thinner plate sections for the bolster web, shear plate and slope sheet may be used by increasing the area of the torsion box and also the increased area lowers the stress which should be kept within the strength of material. It is naturally desirable to maintain the area of the torsion box or triangular beam at the side girder at least equivalent to the area at the car center which is the approximate situation in the folding slope sheet or second embodiment.

It will be appreciated that the shear plate means may extend outwardly of the bolster web and be provided with a transverse stiffener in any of the modifications.

The foregoing description and drawings are given merely to explain and illustrate the invention, and the invention is not to be limited thereto, since those skilled in the art who have the disclosure before them will be able to make modifications and variations therein without departing from the scope of the invention.

We claim:
1. A hopper vehicle construction comprising:
  a pair of longitudinally extending side girders,
  each side girder being defined by a plurality of upright side posts and side sheeting mounted on said side posts,
  each side girder having an upper longitudinally extending reinforcing side plate connecting with the upper parts of each of the side posts and with the side sheeting,
  each side girder having a lower reinforcing side sill extending longitudinally and connecting with the lower end of each of the posts and connecting with the side sheeting,
  truck means at each vehicle end,
  an end construction at each end of the vehicle supported by a respective truck means and joining with the side girders and comprising a central stub sill on the underside of the vehicle and on a respective truck means, an underframe transverse bolster structure over each vehicle truck means and connecting with a respective stub sill and with each side sill, an end wall sloping upward toward each outer end of the vehicle and connecting with each side girder, an upright bolster web mounted over the central stub sill and connected with each side girder, and shear plate means mounted on each stub sill and extending laterally thereof and connecting with a respective side girder,
  said side sills being disposed upwardly and laterally each of said stub sills,
  each of said shear plate means comprising a pair of laterally upwardly diagonally extending shear plate portions connecting each stub sill with the opposed side sills,
  said end wall comprising a slope sheet extending diagonally downward and inward, the slope sheet connecting with the upper portion of the bolster web and with the inner end portion of the respective shear plate means to define a respective torsion box, a torque being applicable thereto by the coupler force on a respective stub sill, the horizontal distance between the bolster web and the slope sheet at a given elevation being greater along a longitudinally extending vertical plane passing through either of the side girders than a longitudinally extending vertical plane passing through the central sill portion.
2. A hopper vehicle construction comprising:
  a pair of longitudinally extending spaced apart side girders each having a lower side sill extending longitudinally,
  an end construction at each end of the vehicle joining with the side girders and comprising:
  a central longitudinally extending sill portion at each end on the underside of the vehicle,
  said side sills being disposed upwardly and outwardly and laterally of each of said central sill portions,
  an end wall sloping upward toward each respective outer end of the vehicle and connecting with each side girder,
  an upright transverse bolster web for each sloping end wall extending upward thereto and connecting with each side girder,
  shear plate means mounted on each central sill portion,
  each of said shear plate means comprising a pair of laterally upwardly diagonally extending shear plate portions connecting its respective central sill portion with each of the side sills, said sloping end wall comprising a slope sheet extending diagonally downward and inward and connecting with the upper portion of the bolster web and with the upper portion of the bolster web and with the inner end of the shear plate means to define with the bolster web and the shear plate means a torsion box, a torque being applicable thereto by the coupler force on a respective central sill portion, the horizontal distance between the bolster web and the slope sheet at a given elevation being greater along a longitudinally extending vertical plane passing through either of the side girders then a longitudinally extending vertical plane passing through the central sill portion.

3. The invention according to Claim 2, and
the longitudinal cross sectional area of the torque box being at least as great along a plane passing through the end sill portion as a plane passing through either of the side girders.

4. The invention according to Claim 2, and
said slope sheet between the upper end of the bolster web and the inner end of the shear plate means having a pair of lateral portions each extending in opposite direction from one another laterally inwardly from the central sill portion to a respective side sill to increase the area of the torsion box.

5. The invention according to Claim 2, and
said bolster web having laterally extending portions each connecting between the central sill portion and the respective side sill, each lateral portion extending divergingly outwardly longitudinally of the car from the central sill portion to the side sill to increase the area of the torsion box.

6. The invention according to Claim 2, and
said shear plate means having a pair of longitudinally extending laterally spaced apart gusset structures within the torsion box and extending upwardly from the shear plate means over the central sill portion and connecting with the upright bolster web and said slope sheet for reinforcement of the torsion box.

7. The invention according to Claim 6, and
said shear plate means having its lateral portions diverging upwardly and outwardly from said gusset structures to the side sills.

8. The invention according to Claim 2, and
outer reinforcing elements on the bolster web outside of the torsion box extending upwardly from the upwardly extending portions of the shear plate means and inner reinforcing elements extending upwardly from the upper extending portions of the shear plate means on the bolster web on the inside of said torsion box and longitudinally aligned with said outer elements.

9. The invention according to Claim 6, and
said gusset structures each having a longitudinally extending area approximately the cross sectional area of the torsion box.

10. The invention according to Claim 2, and
said shear plate means having a flat central portion over said end sill portions and connecting with said upwardly diverging portions in the form of a gull wing, and
said bolster web having a central lower edge engaging with the central portion of the shear plate means and having lower lateral edges joining with the diverging portions of the plate means.

11. The invention according to Claim 2, and
said shear plate means having a flat central portion over said end sill portions and connecting with said upwardly diverging portions in the form of a gull wing,
the slope sheet having a central inwardly sloping portion and having lateral end portions extending inwardly and upwardly, for connecting with the side girders, and
the central portion of the slope sheet joining with the central portion of the shear plate means.

12. A hopper vehicle end construction comprising:
a central longitudinally extending sill portion,
a hopper end slope sheet portion sloping downwardly and inwardly of the end construction,
said end construction having laterally spaced apart longitudinally extending side girders each including a side sill and connecting with the slope sheet portion,
shear plate means mounted on the central sill portion and connecting with each of said side sills,
a transverse bolster web joining the shear plate means with the slope sheet portion spaced thereabove and connecting with the side girders.
said shear plate means joining with said slope sheet portion to form with the bolster web a torsion box.
said shear plate means comprising a generally horizontal central portion connecting with the central sill portion and having laterally upwardly and laterally outwardly divergent portions each being connected with a respective side sill.
said central and laterally upwardly diverging portions defining a gull wing design shear plate means, the horizontal distance between the bolster web and the slope sheet at a given elevation being greater along a longitudinal vertical plane passing through either of the side girders than a longitudinal vertical plane passing through the central sill position.

13. The invention according to Claim 12, and
said bolster web having a central portion on the central sill portion and having lateral portions extending laterally outwardly of the car for maintaining or increasing the longitudinally cross sectional area of the torsion box in any longitudinal vertical plane outwardly from the central sill portion to the side girders.

14. The invention according to Claim 12, and
said slope sheet portion having a central portion joining with the inner part of said central sill portion and having lateral portions extending inwardly and upwardly to the side girders to maintain or increase the longitudinally cross sectional area of the torsion box in any longitudinal vertical plane outwardly from the central end sill portion to the side girders.

15 The invention according to Claim 12, and
upright gusset means in the torsion box being over the central sill portion for distributing the load into the torsion box and reinforcing the torsion box.